United States Patent [19]

Kobayashi et al.

[11] Patent Number: 5,723,048
[45] Date of Patent: Mar. 3, 1998

[54] METHOD OF ANAEROBIC DIGESTION OF SEWAGE SLUDGE

[75] Inventors: Yoshio Kobayashi; Minoru Akita, both of Osaka, Japan

[73] Assignee: Hitachi Zosen Corporation, Osaka, Japan

[21] Appl. No.: 669,450

[22] PCT Filed: Dec. 26, 1994

[86] PCT No.: PCT/JP94/02238

§ 371 Date: Jun. 27, 1996

§ 102(e) Date: Jun. 27, 1996

[87] PCT Pub. No.: WO95/18073

PCT Pub. Date: Jul. 6, 1995

[30] Foreign Application Priority Data

Dec. 28, 1993 [JP] Japan ............ 5-335551

[51] Int. Cl.⁶ .................................................. C02F 3/28
[52] U.S. Cl. .......................... 210/603; 210/609; 210/612; 210/613
[58] Field of Search .......................... 210/603, 605, 210/609, 612, 613, 630

[56] References Cited

U.S. PATENT DOCUMENTS

| | | | |
|---|---|---|---|
| 4,213,857 | 7/1980 | Ishida et al. | 210/603 |
| 4,289,625 | 9/1981 | Tarman et al. | 210/603 |
| 4,988,442 | 1/1991 | Highsmith et al. | 210/609 |
| 5,076,927 | 12/1991 | Hunter | 210/613 |
| 5,207,911 | 5/1993 | Pellegrin et al. | 210/613 |
| 5,264,349 | 11/1993 | De Baere | 210/613 |
| 5,290,450 | 3/1994 | Kobayashi | 210/613 |
| 5,338,445 | 8/1994 | Zumbragel et al. | 210/603 |
| 5,451,319 | 9/1995 | Kobayashi | 210/603 |

FOREIGN PATENT DOCUMENTS

| | | |
|---|---|---|
| 57-42400 | 2/1982 | Japan . |
| 60-3878 | 1/1985 | Japan . |
| 63-25839 | 5/1988 | Japan . |
| 2-31898 | 2/1990 | Japan . |

*Primary Examiner*—Neil McCarthy
*Assistant Examiner*—Theodore M. Green
*Attorney, Agent, or Firm*—Armstrong, Westerman, Hattori, McLeland & Naughton

[57] ABSTRACT

A method of anaerobic digestion of sewage sludge including the steps of subjecting surplus sludge to preliminary heat treatment at 60° C. or higher, dewatering the surplus sludge to make dewatered sludge of 10 to 25% by weight, mixing the dewatered sludge with digested sludge which is taken out from a methane fermentation vessel of dewatered sludge, and supplying the resulting mixture to the methane fermentation vessel of dewatered sludge while discarding digested sludge whose amount is equal to that of the dewatered sludge supplied. According to the method, the sewage sludge containing a large quantity of surplus sludge is subjected to preliminary heat treatment, and then the heat-treated sludge is dewatered to permit a nitrogenous component to be transferred to eliminated water whereby the nitrogenous component in the dewatered sludge can be reduced. The resulting dewatered sludge can stably undergo methane fermentation even at a high concentration of 10 to 25% by weight.

8 Claims, 11 Drawing Sheets

METHOD OF ANAEROBIC DIGESTION OF SEWAGE SLUDGE

TECHNICAL FIELD

The present invention relates to a method of efficient anaerobic digestion of sewage sludge to utilize the sewage sludge as energy resources.

BACKGROUND ART

Methane fermentation of sewage sludge has been known as an important unit process of sewage treatment since older times. However, the method has disadvantages such as large equipment, low digestion rate and inefficiency, so that the method is likely to be kept at a distance. Recently, with a rise in consciousness of the global environment, people have reconsidered the importance of methane fermentation of the sewage sludge which is regenerable energy resources. Technological innovation based on new conception is required in order to utilize the sewage sludge as energy resources.

As a means to promote efficiency of methane fermentation, there can be given 1) high-temperature fermentation, 2) heat treatment of sludge and 3) increasing concentration of sludge. However, 1) and 2) closely relate to 3) in terms of heat balance, and 3) is necessary in order to carry out 1) and 2). Therefore, 3) increasing the concentration of sludge is the most important matter of all.

Figure 11:
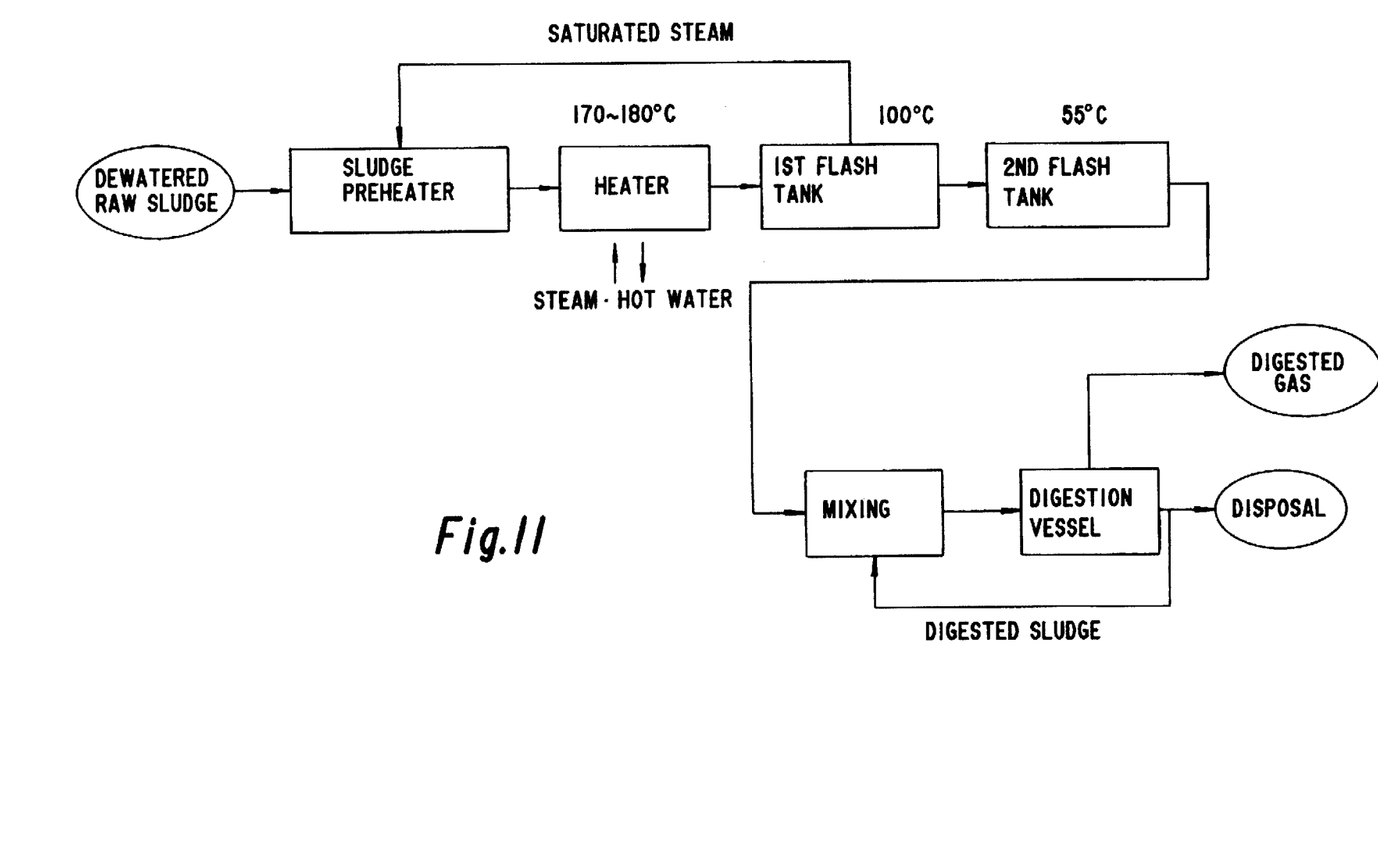
FIG. 11 is a flow scheme according to the method described in Japanese Laid-open Patent Publication No. 2-31898.

In this respect, as shown in FIG. 11, there has been a method of anaerobic digestion of sewage sludge wherein a part of digested sludge is discarded after methane fermentation, while the rest of the digested sludge is circulated, raw sludge is added to the circulating digested sludge and the mixture is subjected to methane fermentation, the method comprising the steps of dewatering the above raw sludge to 10% or higher of concentration of solid matter, subjecting the resulting dewatered sludge to heat treatment at 120° to 180° C., adding the heat-treated sludge to the above circulating digested sludge, mixing them uniformly and subjecting the mixture to methane fermentation (Japanese Laid-open Patent Publication No. 2-31898).

However, in this method, the sludge is subjected to heat treatment after dewatering the sludge, so that the method had the following problem. In the case of sewage sludge containing much surplus sludge, subjecting dewatered sludge whose sludge concentration is 10% or higher to heat treatment, total soluble organonitrogen compounds formed by heat treatment are included in the heat-treated sludge. Since the organonitrogen compounds are converted into concentrated $NH_3$ by anaerobic digestion, the digestion rate is depressed low by $NH_3$ concentration obstacle.

DISCLOSURE OF INVENTION

In view of the above point, the object of the present invention is to provide a method of improving gas generation efficiency while decreasing capacity of a digestion vessel in an anaerobic digestion process of sewage sludge.

The method of anaerobic digestion of sewage sludge of the invention is devised in order to achieve the above object. The method comprises the steps of subjecting surplus sludge to preliminary heat treatment at 60° C. or higher, dewatering the surplus sludge to make dewatered sludge of 10 to 25% by weight, mixing the dewatered sludge with digested sludge which is taken out from a methane fermentation vessel of dewatered sludge, and supplying the resulting mixture to the methane fermentation vessel of dewatered sludge while discarding digested sludge whose amount is equal to that of the dewatered sludge supplied.

In the method of anaerobic digestion of sewage sludge of the invention, since the heat treatment has an effect to reduce nitrogenous component on the surplus sludge, the surplus sludge may be subjected to heat treatment singly and the heat-treated surplus sludge may be dewatered singly. A mixture of the surplus sludge with initial settling sludge may also be subjected to heat treatment and dewatered. In addition, the heat-treated surplus sludge and the initial settling sludge may be dewatered separately and they may be mixed each other, that is, the resulting dewatered sludge may be mixed with the dewatered initial settling sludge, to make dewatered sludge of the required concentration.

According to the second embodiment of the method of anaerobic digestion of sewage sludge of the invention, it is also possible to carry out anaerobic treatment of eliminated water obtained by dewatering the heat-treated surplus sludge, and optionally mixed water of the above eliminated water with eliminated water obtained by dewatering the initial settling sludge, or eliminated water obtained by heating and then dewatering the mixture of the surplus sludge with the initial settling sludge, and/or eliminated water obtained by dewatering the digested sludge to discard.

According to the third embodiment of the method of anaerobic digestion of sewage sludge of the invention, it is also possible to use digested gas generated by methane fermentation as an energy source of power generation to obtain electric power. In addition, it is also possible to use steam and/or hot water accompanying power generation as a heat source to heat the above surplus sludge, and optionally the mixture of the surplus sludge with the initial settling sludge.

According to the fourth embodiment of the method of anaerobic digestion of sewage sludge of the invention, the digested sludge to discard may be dewatered and subjected to incineration disposal.

In the method of anaerobic digestion of sewage sludge of the invention, the heat treatment temperature of the surplus sludge is 60° C. or higher, for example, 100° C. or higher, preferably 140° C. or higher, more preferably 160° C. or higher. An upper limit of the heat treatment temperature is not particularly limited but 200° C. of upper limit is preferred. Heat treatment time depends on the treatment temperature and it is, for example, 0.5 to 1.0 hour in case the temperature is 150° C.

The concentration of the dewatered sludge is 10 to 25% by weight, preferably 10 to 20% by weight, more preferably 12 to 20% by weight, most preferably about 15% by weight.

The methane fermentation vessel of dewatered sludge preferably has a tube-bundled structure in order to prevent channelling and preferably takes a compact form which is quite different from conventional forms. While seeded sludge moves slowly through the tube, the sludge undergoes methane fermentation.

There can be applied the known method as a technique of anaerobic digestion of an aqueous solution of organic materials such as Upflow Anaerobic Sludge Blanket (UASB) method using granular methane bacteria to anaerobic treatment of eliminated water.

An upper limit of the sludge concentration in methane fermentation is practically 5 to 6% as total solids (TS) because of a stirring technique.

On the other hand, some literatures remark that domestic refuse and agricultural waste such as beet garbage, potato garbage, vegetable garbage, straw or waste liquid from alcohol distillation can undergo methane fermentation even at high solid content of 20% by weight or higher. However, the inventors found that subjecting sewage sludge of 20% by weight to methane fermentation leads to decreasing gas yield day by day and the fermentation tends to stop.

This results from the fact that the sewage sludge has a higher N content and a lower C/N (carbon content/nitrogen content) ratio, for example, 6 to 10, than the above domestic refuse and agricultural waste. Since nitrogen compounds in raw sludge concentrated more than is necessary by dewatering are converted into concentrated $NH_3$ by methane fermentation, the concentrated $NH_3$ comes to inhibit an activity of the microorganism taking part in methane fermentation. On the other hand, since the content of nitrogen compounds in the agricultural waste such as beet garbage, potato garbage, vegetable garbage, straw or waste liquid from alcohol distillation and the domestic refuse is, for example, at most about one fourth that in the sewage sludge, and C/N ratio in the agricultural waste and the domestic refuse is, for example, at least about four times that in the sewage sludge, it is considered that methane fermentation can be performed as mentioned above.

A detailed experiment on methane fermentation of concentrated sewage sludge proved the following. 1) Methane fermentation can be performed even at a charged sludge concentration of 8 (TS) % or higher. 2) With a rise in the sludge concentration in the fermentation vessel, solubilization of solid organic materials (VSS) is promoted. 3) The rise in the sludge concentration in the fermentation vessel is liable to cause $NH_3$ concentration obstacle. 4) If seeding is fully uniform in charging the sludge into the fermentation vessel, stirring with a completely mixing vessel is unnecessary.

Namely, it was found that it is possible to subject sewage sludge mainly composed of initial settling sludge containing little nitrogenous component to methane fermentation without hindrance even at a sludge concentration of 15 to 20% by weight. However, it was found that it is difficult to carry out the methane fermentation of sewage sludge containing a large quantity of surplus sludge containing much nitrogenous component stably at a high concentration of 12 to 13% by weight or higher.

The sewage sludge containing a large quantity of the surplus sludge is subjected to preliminary heat treatment, and then the heat-treated sludge is dewatered to permit the nitrogenous component to be transferred to eliminated water whereby the nitrogenous component in the dewatered sludge can be reduced. The resulting dewatered sludge can stably undergo methane fermentation even at a high concentration of 10 to 25% by weight.

Methane fermentation of dewatered sludge is excellent in compaction of system but it is in danger of causing the $NH_3$ concentration obstacle. According to the method of the invention, the $NH_3$ concentration obstacle can be overcome by subjecting the surplus sludge to preliminary heat treatment and dewatering. In addition, the heat-treat operation has the action to facilitate methane fermentation by thermal denaturation of protein, so that the operation exerts an effect of increasing the digestion rate from conventional 40–50% to 70%. On the other hand, since the heat treatment improves a dewatering property of the sludge, it was put to practical use. But the heat treatment has not recently been put to practical use because of a disadvantage of producing much organic waste water which is troublesome to treat. However, this problem of the organic waste water can be solved by applying UASB method using granular methane bacteria whose technique has recently made startling progress.

Namely, three characteristic unit processes: a) process of methane fermentation of dewatered sludge which can make the fermentation vessel compact by concentrating the sludge but has the danger of the $NH_3$ concentration obstacle, b) process of heat treatment of surplus sludge which facilitates methane fermentation by thermal denaturation of protein and improves the dewatering property of the surplus sludge while producing a large amount of organic waste water which is troublesome to treat and c) USAB process using granular methane bacteria which exerts its effect on methane fermentation of the aqueous solution of the organic materials but has not been used for the treatment of the sewage sludge mainly composed of VSS: are systemized to draw forth a synergistic effect while compensating for each disadvantage. A cogeneration system by digested gas power generation is incorporated into the above system and it is thereby possible to construct a sludge treatment system which is energetically and economically excellent.

Under these circumstances, according to the method of digestion of the invention, the sewage sludge containing a large quantity of the surplus sludge is subjected to the preliminary heat treatment, and then the heat-treated sludge is dewatered to permit the nitrogenous component to be transferred to the eliminated water whereby the nitrogenous component in the dewatered sludge can be reduced. The resulting dewatered sludge can stably undergo methane fermentation even at the high concentration of 10 to 25% by weight.

Thus methane fermentation can be performed even at a high concentration of the dewatered sludge. It is possible to not only make the methane fermentation step, but also the whole sludge treatment system, compact by increasing the concentration in methane fermentation. It is thereby possible to utilize the sewage sludge as the energy resources and also to sharply reduce the cost price of the sludge treatment.

In this way, the $NH_3$ concentration obstacle can be prevented by subjecting the surplus sludge which is liable to cause the $NH_3$ concentration obstacle but contains much nitrogenous component to the preliminary heat treatment and dewatering. In addition, capacity of the fermentation vessel can be reduced to from 1/3 to 1/10 of that of conventional vessels and the total digestion rate reaches 70%. If seeding is fully uniform in charging the sludge into the fermentation vessel, stirring of the sludge is unnecessary.

BEST MODE FOR CARRYING OUT THE INVENTION

EXAMPLE 1

Figure 1:
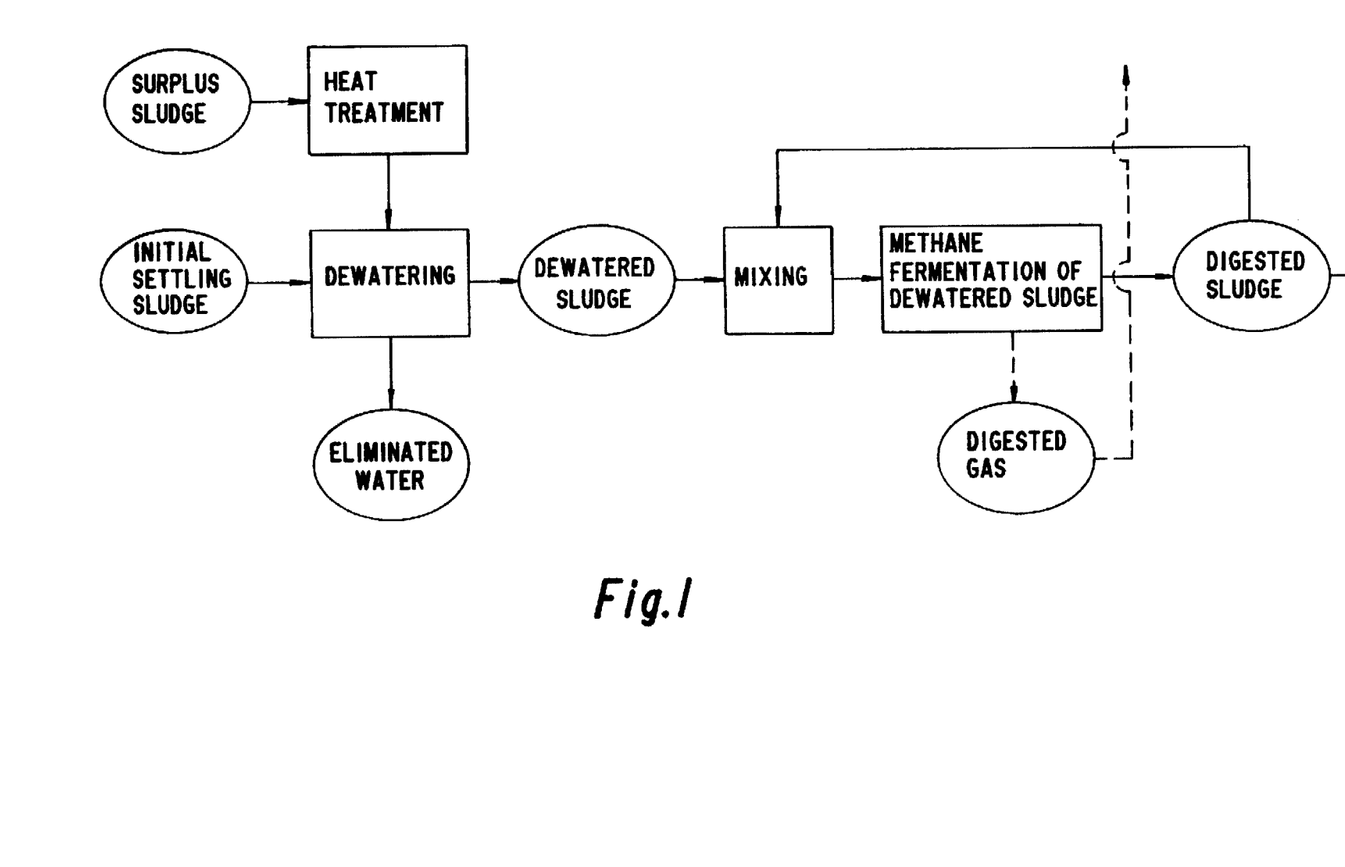
FIG. 1 is a flow scheme according to Example 1.

A flow scheme according to an example of the invention is shown in FIG. 1.

In FIG. 1, surplus sludge of 5% containing about 70% VTS was subjected to heat treatment at 150° C. for 1 hour. The heat-treated sludge was subjected to centrifugal dewatering to give 15% dewatered sludge. On the other hand, 4% initial settling sludge containing about 87% VTS was subjected to sterilizing treatment at about 120° C. and then to centrifugal dewatering to give 15% dewatered sludge. The 15% dewatered sludge from the surplus sludge was combined with the 15% dewatered sludge from the initial settling sludge in the ratio of 4 (surplus):6 (initial settling) and the resulting dewatered sludge was transferred to a mixing vessel. A part of digested sludge was taken out from the undermentioned methane fermentation vessel of dewatered sludge and recycled to the mixing vessel. The digested sludge taken out was mixed with the above dewatered sludge there. The resulting mixture was supplied to the methane fermentation vessel of dewatered sludge. On the other hand, the digested sludge whose amount is equal to that of the dewatered sludge supplied to the methane fermentation vessel of dewatered sludge was taken out from the fermentation vessel.

Figure 5:
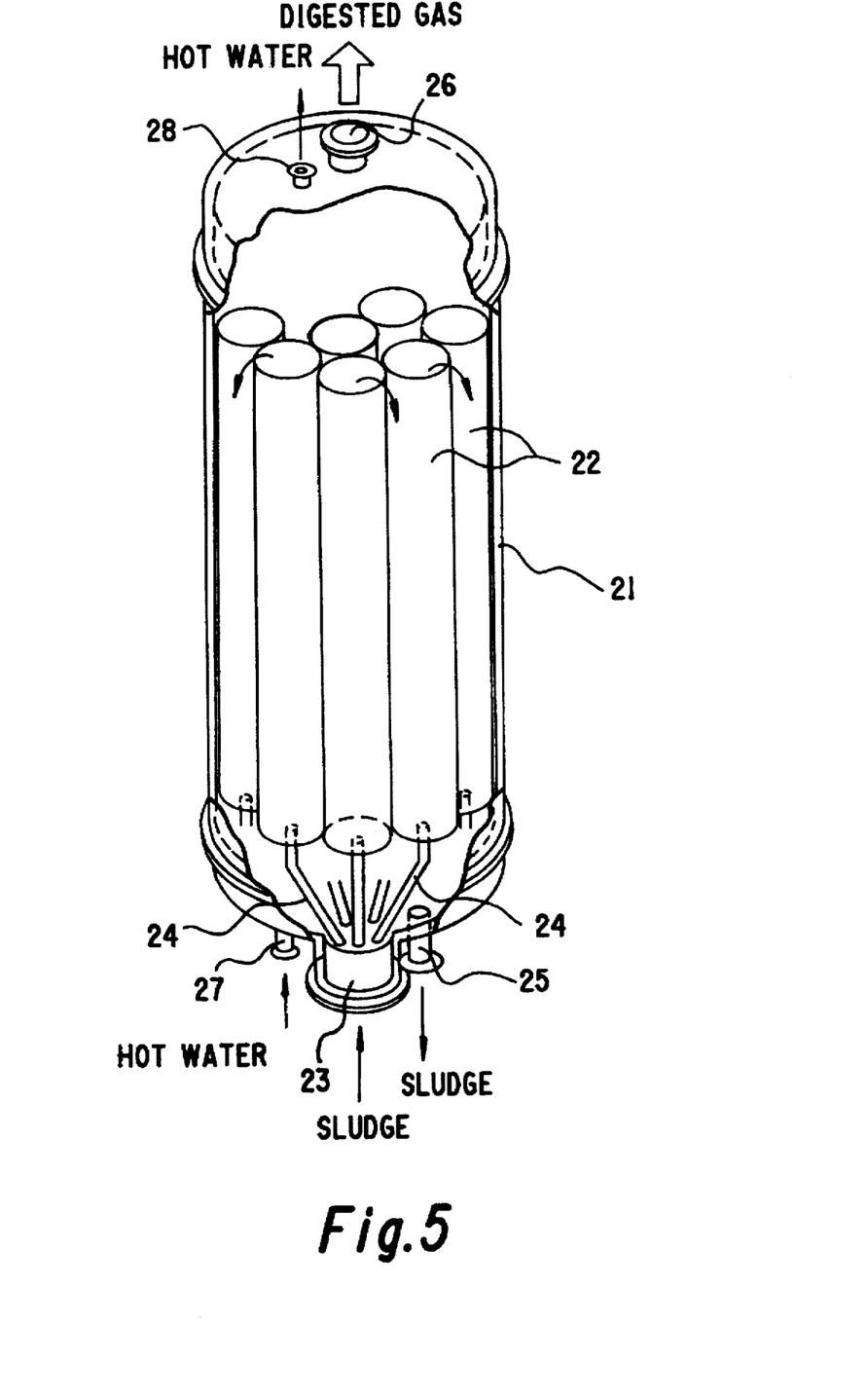
FIG. 5 is a perspective view, partly broken away, showing an example of the methane fermentation vessel of dewatered sludge.

An example of the methane fermentation vessel of dewatered sludge is shown in FIG. 5.

In FIG. 5, a jacket (21) contains tubes (22). The tubes (22) have, for example, diameter of 0.2 to 1.0 m and length of 10 to 30 m. The bottom of the fermentation vessel is provided with a sludge feed opening (23) and to the sludge feed opening (23) is connected sludge distribution pipes (24) extending to the lower end of each tube (22). The jacket (21) is provided with a hot water inlet (27) at the bottom and a hot water outlet (28) at the top respectively. The top of the fermentation vessel is provided with a digested gas outlet (26) to take out digested gas generated in the vessel.

In the above constitution, sludge supplied from the sludge feed opening (23) is taken out into each tube (22) with the sludge distribution pipes (24). The sludge is gradually pushed up in the tubes (22), runs over at the upper end of each tube (22), and then drops on each outer surface of the tubes (22). The sludge which has dropped in this way is discharged from a sludge outlet (25), and a part of the sludge is discarded, while the rest of the sludge is circulated to the mixing vessel.

The sludge is digested while rising in the tubes (22) and dropping on each outer surface of the tubes (22). It is possible to equalize the rate of travel of the sludge in the tube and to prevent non-uniformity of the transfer of the sludge such as shortcircuiting flow by adopting such method.

EXAMPLE 2

Figure 2:
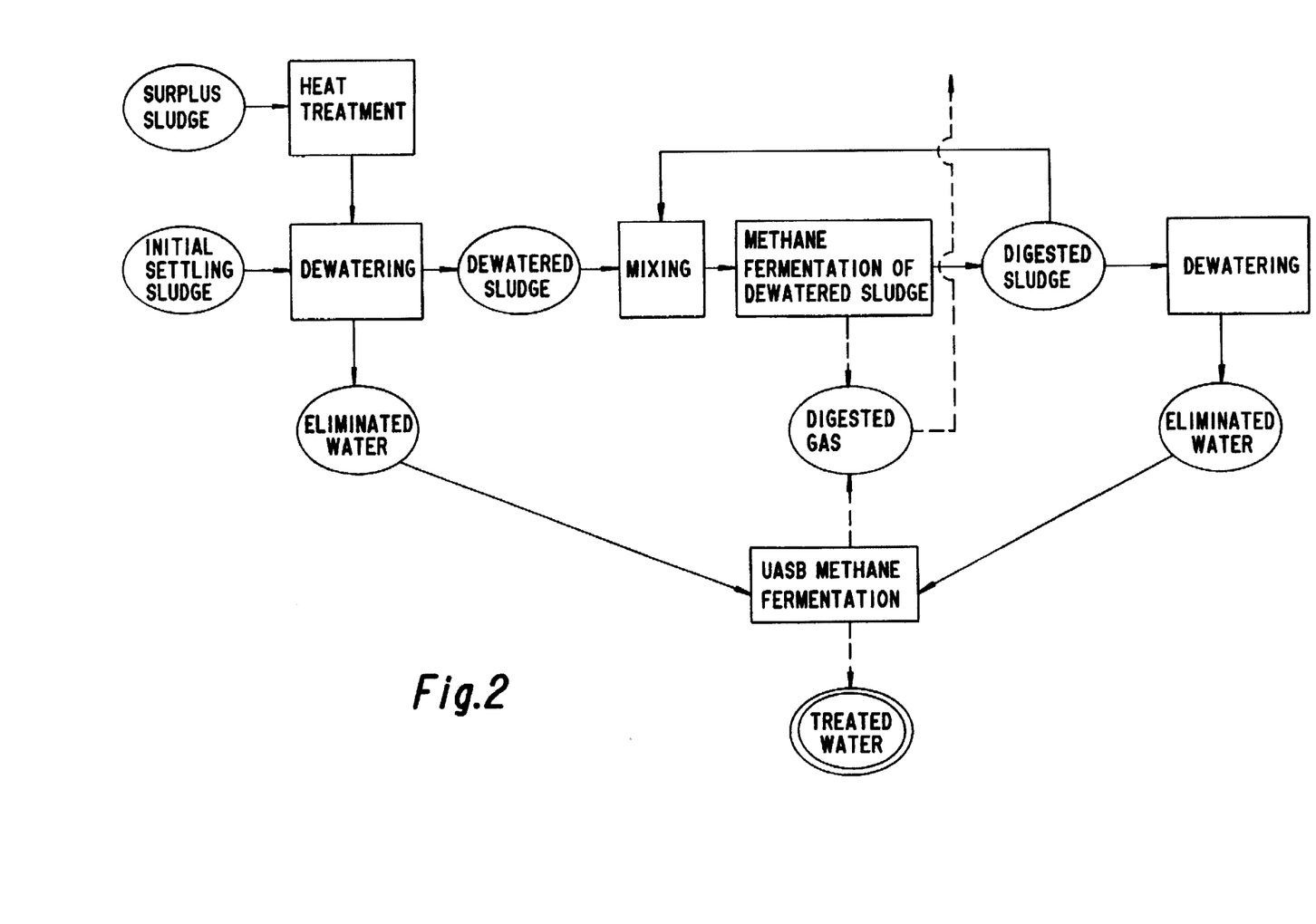
FIG. 2 is a flow scheme according to Example 2.

In FIG. 2, an operation similar to Example 1 was performed in this Example, and then the eliminated water produced by dewatering heat-treated surplus sludge was transferred to a UASB methane fermentation vessel. In addition, the digested sludge to discard was dewatered and the resulting eliminated water was also transferred to the UASB methane fermentation vessel. The combined eliminated water was treated with granular methane bacteria there and the treated water discharged from the UASB methane fermentation vessel was discarded.

EXAMPLE 3

Figure 3:
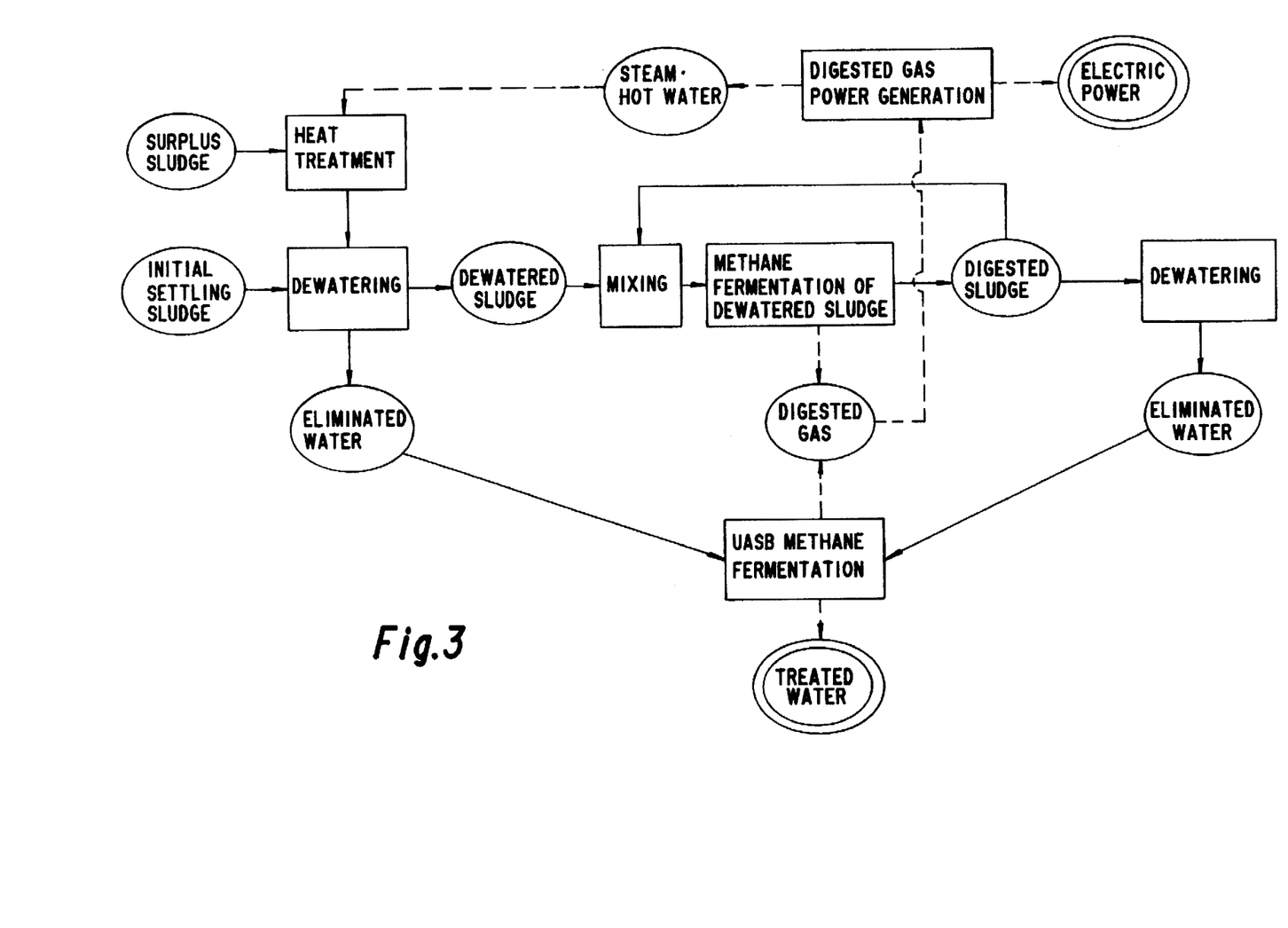
FIG. 3 is a flow scheme according to Example 3.

In FIG. 3, an operation similar to Example 2 was performed in this Example, and then the digested gas discharged from a methane fermentation vessel of dewatered sludge and a UASB methane fermentation vessel was transferred to a digested gas generating unit and used as an energy source thereof to give electric power. In addition, steam or hot water generated in the generating unit as used as a heat source for heat treatment of the above surplus sludge and the initial settling sludge.

EXAMPLE 4

Figure 4:
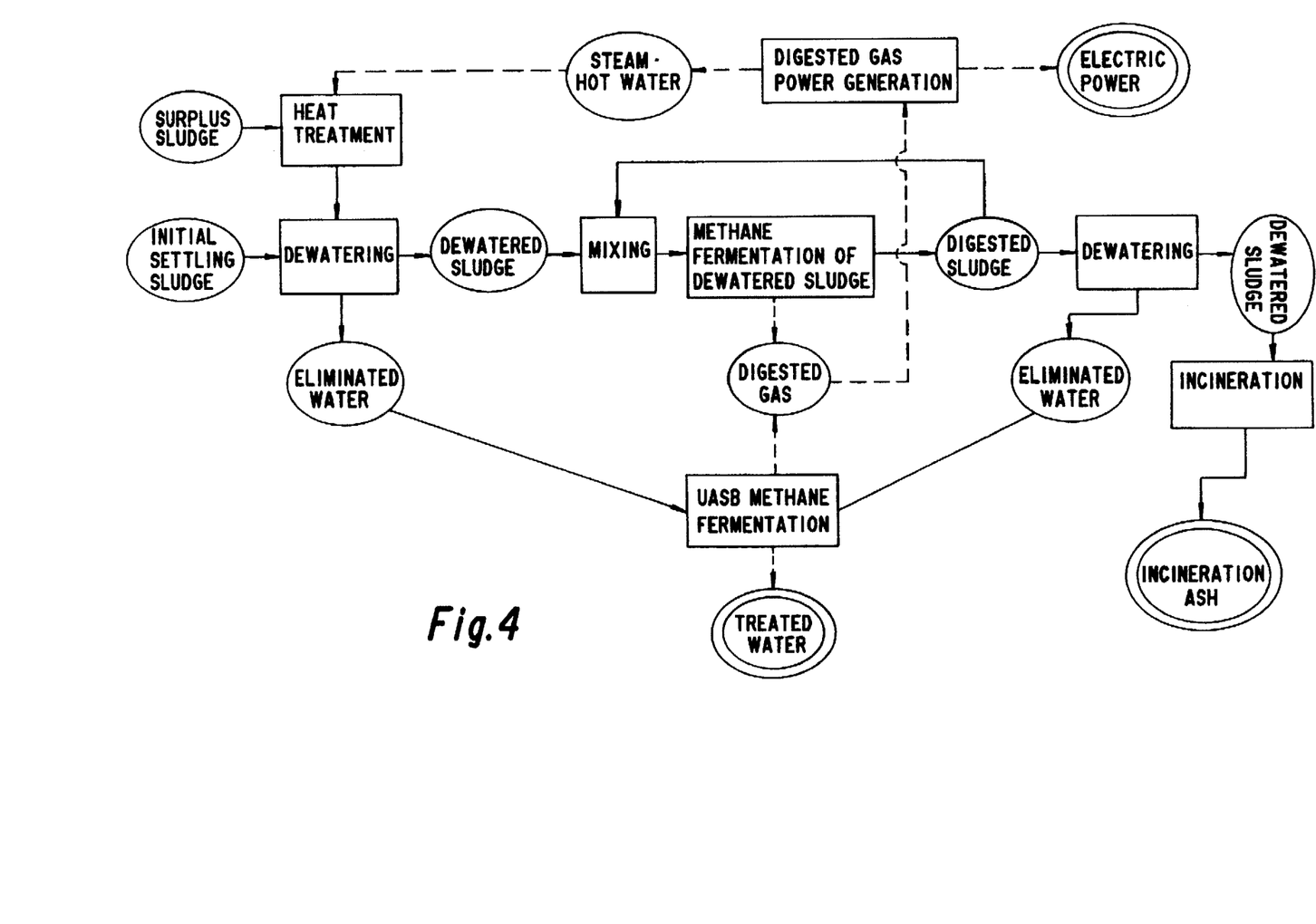
FIG. 4 is a flow scheme according to Example 4.

In FIG. 4, an operation similar to Example 3 was performed in this Example, and then digested sludge to discard was dewatered and subjected to incineration disposal.

Figure 6:
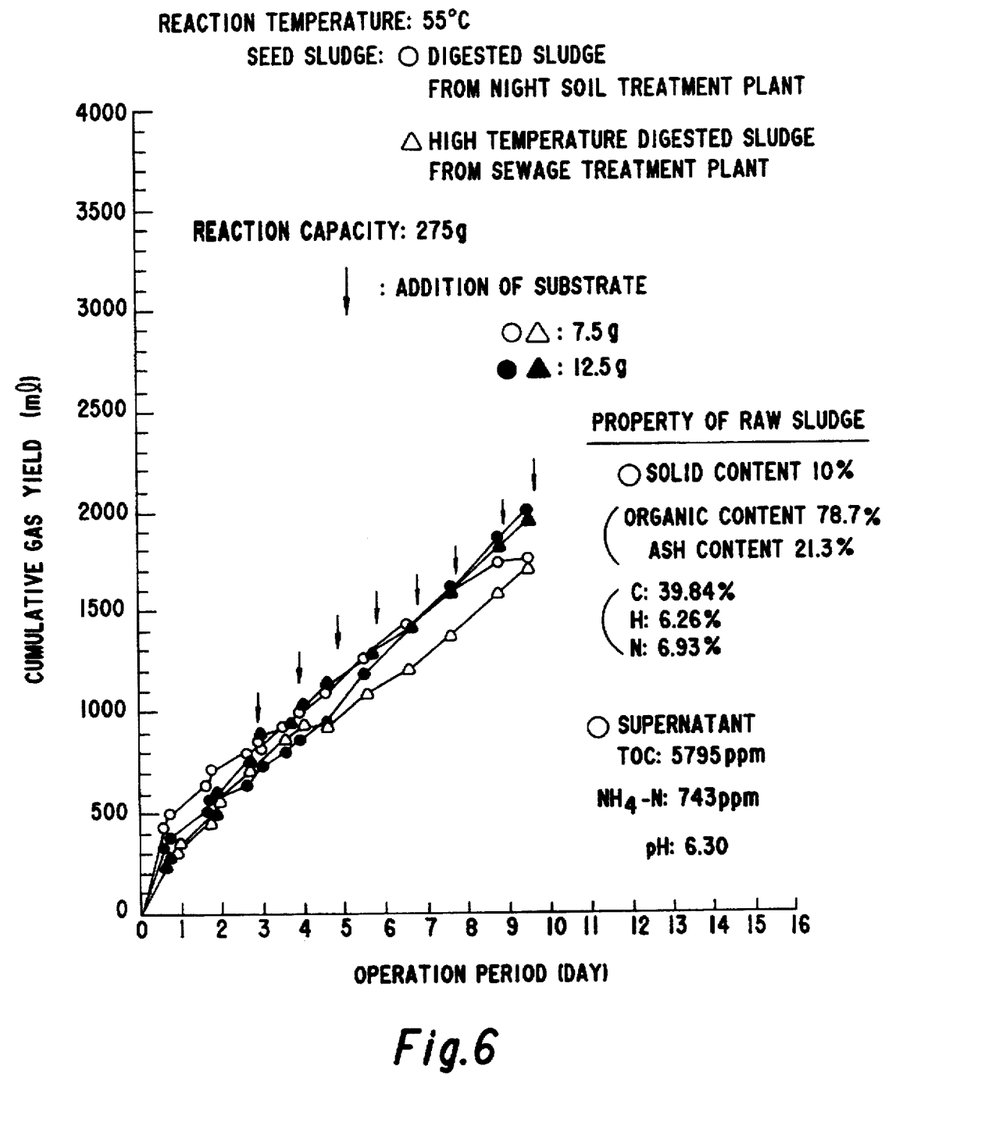
FIG. 6 is a graph showing relations between the operation period and the cumulative gas yield in case the sludge is treated according to the digestion method described in Example 1.

FIG. 6 is a graph showing relations between the operation period and the cumulative gas yield in case surplus sludge subjected to heat treatment and then dewatered according to the digestion method of the invention was treated according to the flow shown in FIG. 1 under the condition shown in FIG. 6.

Figure 7:
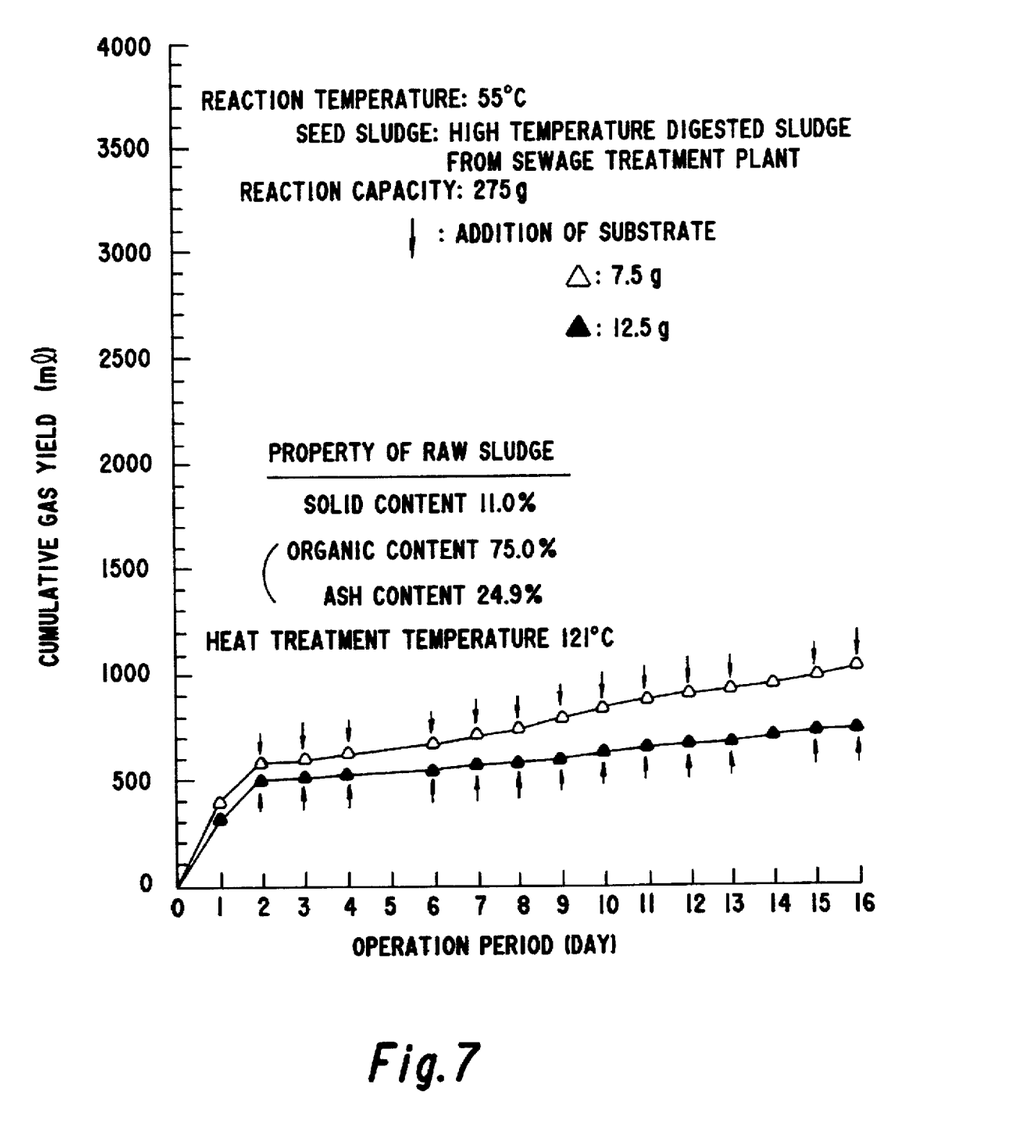
FIG. 7 is a graph showing relations between the operation period and the cumulative gas yield in case the sludge is treated according to the method described in Japanese Laid-open Patent Publication No. 2-31898.

FIG. 7 is a graph showing relations between the operation period and the cumulative gas yield in case surplus sludge subjected to heat treatment and then dewatered according to the method in Japanese Laid-open Patent Publication No. 2-31898 shown in FIG. 11 as a prior art was treated under the condition shown in FIG. 7.

In FIGS. 6 and 7, the expression "addition of substrate" means that water containing a substrate was added, and the arrows mean that reaction slurry whose amount is equal to that of the added water containing the substrate was taken out. Reaction capacity was thereby kept constant at 275 g.

As apparent from comparison between FIGS. 6 and 7, the cumulative gas yield reaches the top from the 2nd day of operation on in FIG. 7. On the other hand, the cumulative gas yield is found to increase with operation period in FIG. 6.

EXAMPLE 5

Figure 8:
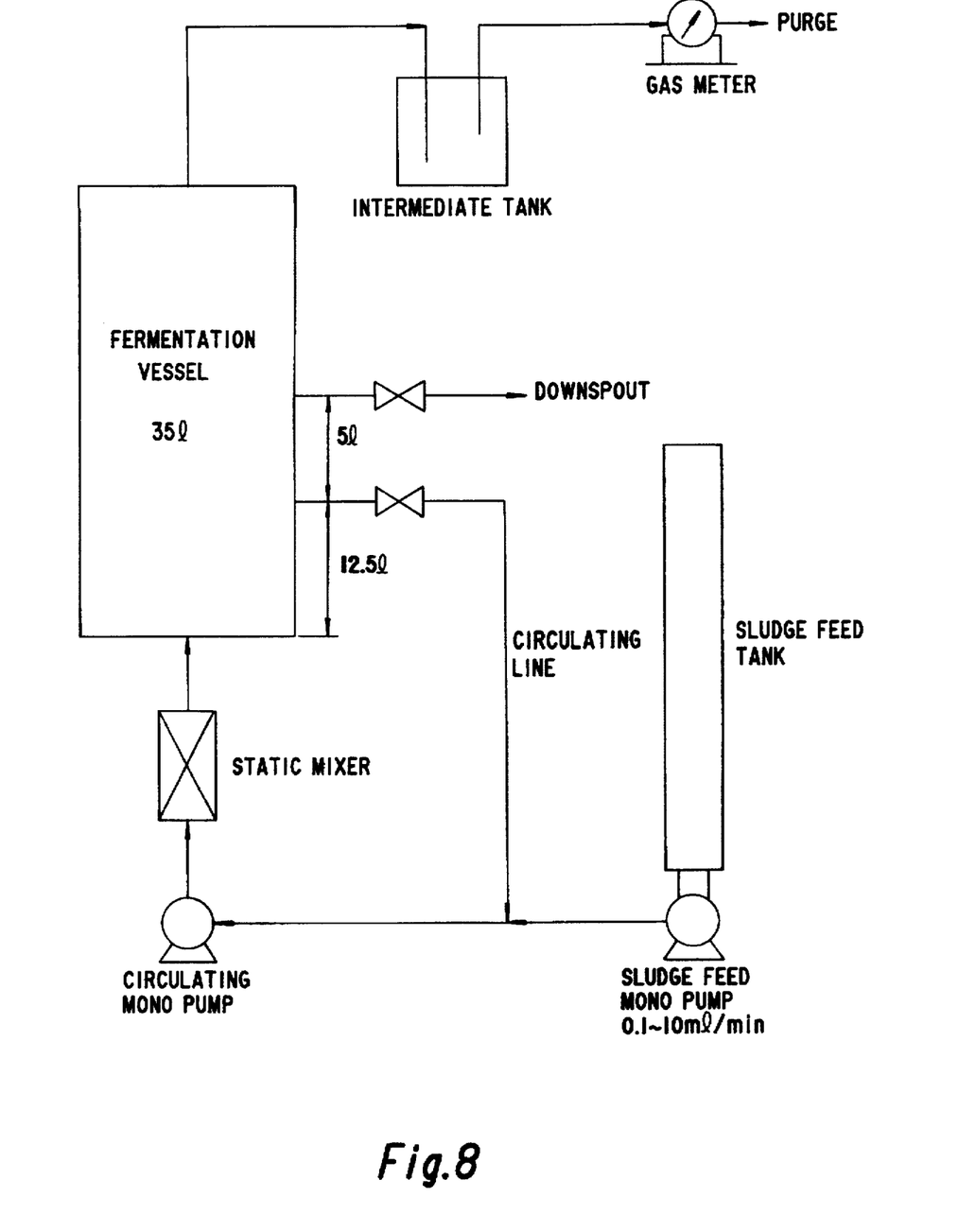
FIG. 8 is a schematic drawing showing the continuous experiment described in Example 5.

In this Example, continuous experiments were performed on large scales according to the flow shown in FIG. 8.

A continuous experiment was first performed on 1.5 (TS) % initial settling sludge. Subsequently another continuous experiment was performed on mixed sludge obtained by mixing a dewatered cake of surplus sludge heat-treated at 150° C. for 1 hour with the initial settling sludge in the ratio of 40%:60% on the basis of TS and adjusting sludge concentration to 1.5 (TS) %.

1) Method of continuous experiment

In FIG. 8, the digestion vessel is a vessel of 35 liters (208 mm in inside diameter×1046 mm in height) provided with a hot water jacket. About 15 liters of seed sludge obtained by centrifugal dewatering of high temperature fermented digested sludge which was supplied from a night soil treatment plant and adjusted to 6.5 (TS) % was charged into the digestion vessel. Then initial settling sludge (VTS 87%) supplied from a separation type sewage treatment plant was sterilized at about 120° (for working atmosphere) and subjected to centrifugal dewatering to adjust to 15 (TS) %. Fiber in the sludge was broken up with a cutter mixer in order to prevent an experimental Mono pump from being clogged and to carry out constant supply smoothly. The resulting sludge was mixed with the digested sludge taken out from the digestion vessel in the ratio of 1 (initial settling):2 (digestion) in advance, and the resulting seeding sludge was charged into a sludge feed tank provided with a cold water jacket.

The sludge in the digestion vessel was circulated with a circulating Mono pump at the rate of about 50 ml/min. The seeding sludge was injected into the circulating line from the sludge feed tank at the rate of about 2 ml/min and supplied into the digestion vessel through a line mixer. The digested sludge whose amount is equal to that of the supplied sludge was intermittently taken out from a downspout.

In the digestion vessel, a circulating part was 12.5 liters, a standing part was 5.0 liters, and a fermentation temperature was adjusted to $52°\pm 2°$ C.

On the other hand, in the continuous experiment of surplus sludge, surplus sludge (4 to 5 (TS) %, VTS about 70%) supplied from a combined system sewage treatment plant was subjected to heat treatment in an autoclave at 150° C. for 1 hour and then to centrifugal dewatering.

The resulting dewatered cake was mixed with the initial settling sludge dewatered and then broken up with the cutter mixer in the ratio of 4 (surplus):6 (initial settling) on the basis of TS, the sludge concentration was adjusted to 15 (TS) %, and then the mixture was charged into the feed sludge tank. The initial settling/surplus mixed sludge was injected into the sludge circulating line of the digestion vessel acclimatized with the 15 (TS) % initial settling sludge for 7 days from the feed sludge tank at the rate of about 0.8 ml/min and supplied into the digestion vessel through the line mixer.

2) Result of continuous experiment and investigation

Figure 9:
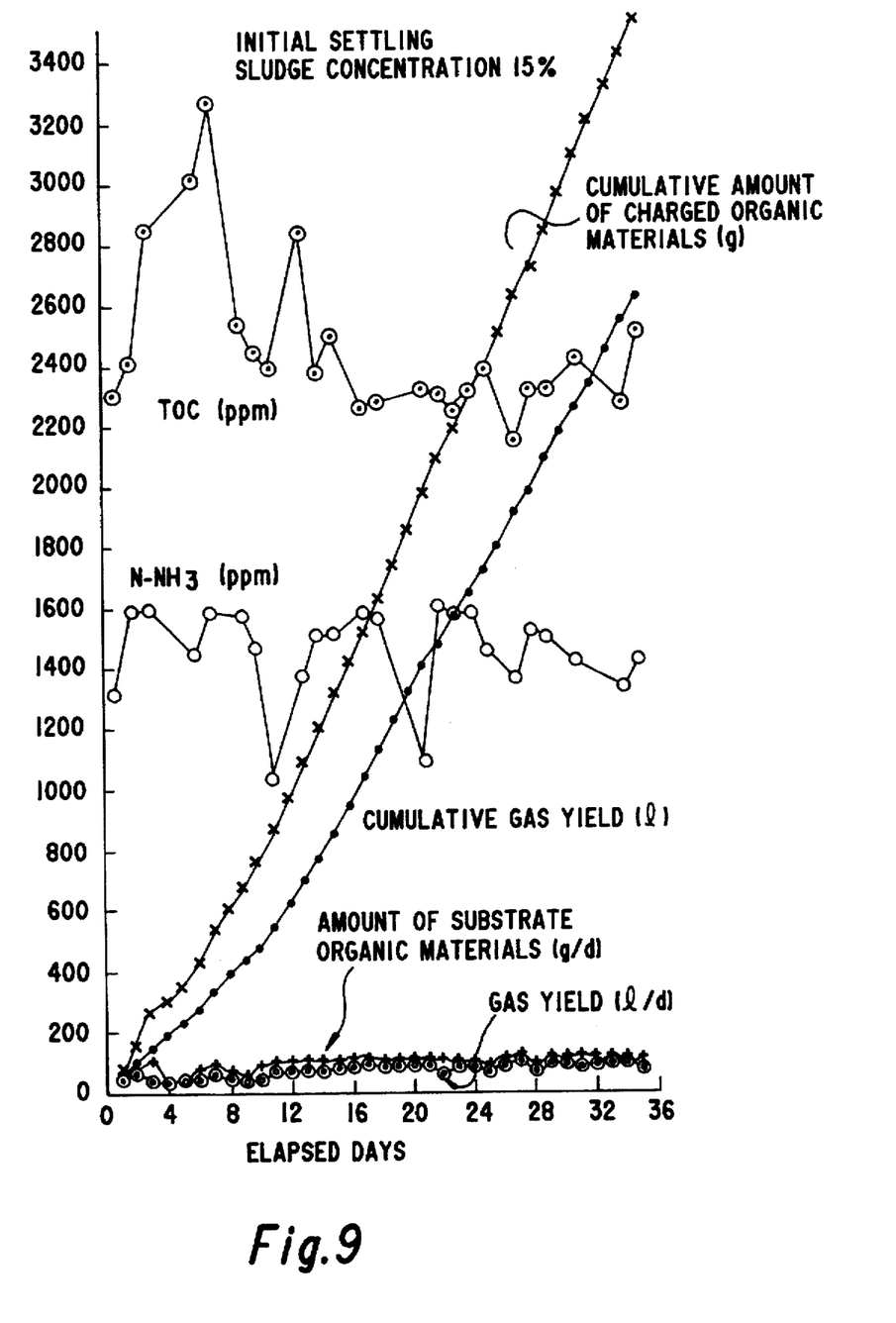
FIG. 9 is a graph showing data of continuous methane fermentation of the 15 (TS) % dehydrate of the initial settling sludge.

FIG. 9 shows datum of continuous methane fermentation of the 15 (TS) % dehydrate of the initial settling sludge. Judging from changes of TOC and $NH_3$-N concentrations with time, it is seen that stable operation is performed from the about 20th day of operation on. The ammonia nitrogen concentration which had caused anxiety was stable at the level of 1500 to 1600 ppm and the value did not vary greatly even for the operation period of 2 months.

In addition, it was possible to insure 5 to 8 g (VSS)/1·day of organic matter loading on the average for 35 days.

Figure 10:
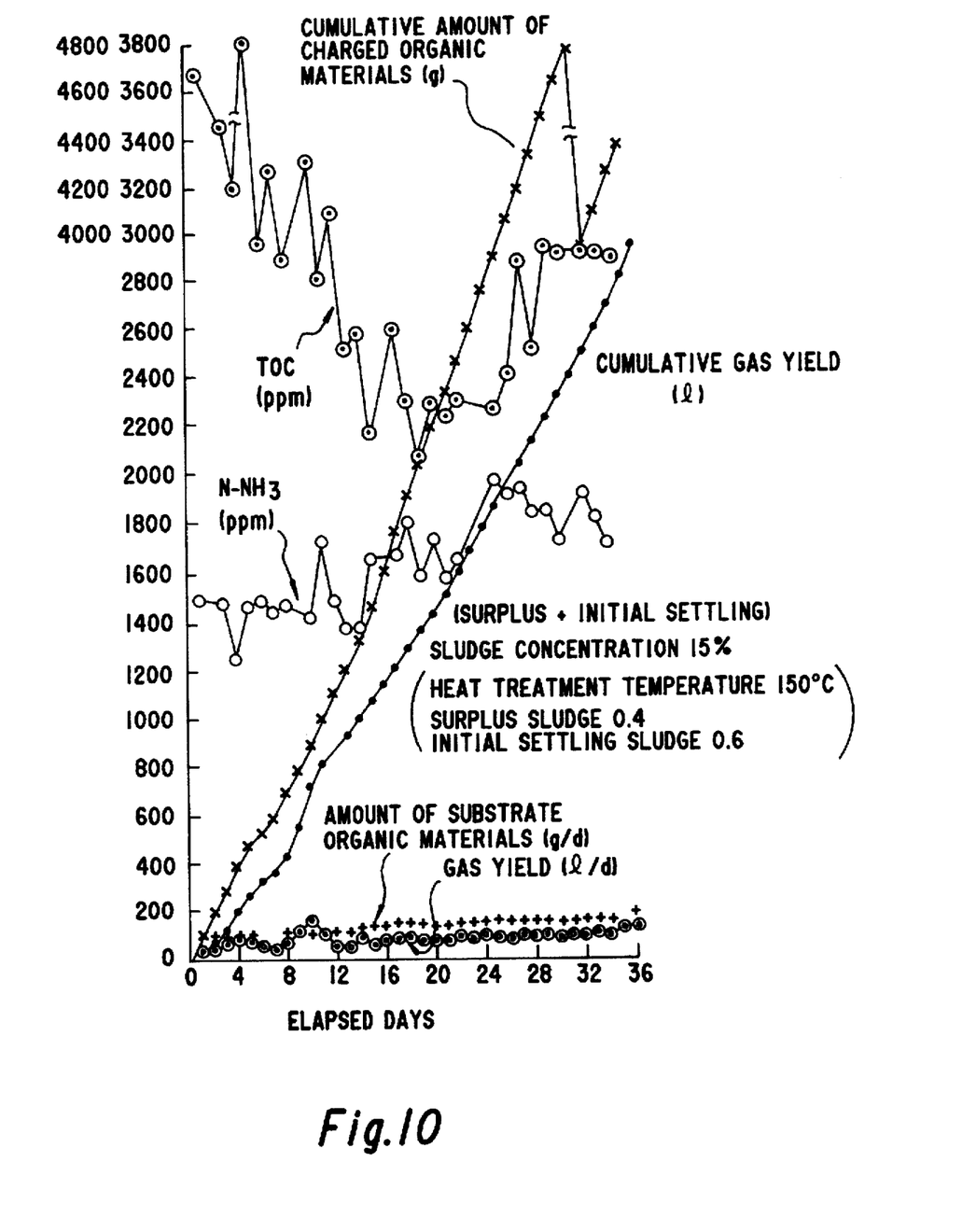
FIG. 10 is a graph showing data of continuous methane fermentation of the 15 (TS) % initial settling/heat-treated surplus mixed sludge.

FIG. 10 shows datum of continuous methane fermentation of the 15 (TS) % of the initial settling/heat-treated surplus mixed sludge. Judging from changes of TOC and $NH_3$-N concentrations with time, it is seen that stable operation is performed from the about 30th day of operation on. It was possible to depress the $NH_3$-N concentration which had caused the greatest anxiety in this experiment to 2000 ppm or lower because nitrogenous component had been reduced in advance by subjecting the surplus sludge to heat treatment (in using dewatered cake of mixed raw sludge subjected to heat treatment at 120° C. for sterilization without dewatering, gas yield decreased day by day and the fermentation stopped before long).

Since methane fermentation is reported to be performed at ammonia nitrogen concentration of 2300 to 3200 ppm in a night soil treatment plant, the value of 2000 ppm or lower is allowable.

This experiment was discontinued on the 36th day. It is thought that 10 g/(VSS)/1·day of organic matter loading can be insured in the same way as the case of the initial settling sludge continuing for 2 months.

Moreover, in the continuous experiments of both the initial settling sludge and the heat-treated surplus mixed sludge, TOC concentration level is 2000 to 3000 ppm and considerably high as compared with usual methane fermentation (2 to 5 (TS) %) in which TOC is a few hundred ppm. This means that a rate-determining step of methane fermentation shifted from a solubilization step into a methane formation step because solubilization of VSS is promoted in methane fermentation of dewatered sludge. But it is thought that methane bacteria corresponding to TOC will proliferate and the problem of high level TOC will soon be solved continuing the continuous experiment for a long period of time. However, even if not, it is possible to treat the high level TOC efficiently combined with UASB process using granular methane bacteria.

INDUSTRIAL APPLICABILITY

The present invention relates to a method of efficient anaerobic digestion of sewage sludge to utilize the sewage sludge as energy resources.

According to the invention, the sewage sludge containing a large quantity of surplus sludge is subjected to preliminary heat treatment, and then the heat-treated sludge is dewatered to permit a nitrogenous component to be transferred to eliminated water whereby the nitrogenous component in the dewatered sludge can be reduced. The resulting dewatered sludge can stably undergo methane fermentation even at a high concentration of 10 to 25% by weight.

What is claimed is:

1. A method of anaerobic digestion of sewage sludge, comprising steps of subjecting surplus sludge to preliminary heat treatment at 60° C. or higher, dewatering the surplus sludge to make dewatered surplus sludge, mixing the dewatered surplus sludge with digested sludge which is taken out from a methane fermentation vessel for dewatered sludge, supplying the resulting mixture to the methane fermentation vessel for dewatered sludge, and discarding an amount of digested sludge equal to the amount of dewatered sludge supplied to the methane fermentation vessel.

2. A method of anaerobic digestion of sewage sludge as defined in claim 1 further including dewatering initial settling sludge and mixing the dewatered initial settling sludge with the dewatered surplus sludge to form a sludge of required concentration for supply to the methane fermentation vessel.

3. A method of anaerobic digestion of sewage sludge as defined in claim 1 wherein a mixture of the surplus sludge with initial settling sludge is subjected to the heat treatment.

4. A method of anaerobic digestion of sewage sludge as defined in any one of claims 1 to 3 wherein eliminated water obtained by dewatering the heat-treated surplus sludge, and optionally mixed water of the eliminated water with eliminated water obtained by dewatering an initial settling sludge, or eliminated water obtained by heating and then dewatering a mixture of the surplus sludge with an initial settling sludge, and/or eliminated water obtained by dewatering the digested sludge to discard is subjected to anaerobic treatment.

5. A method of anaerobic digestion of sewage sludge as defined in any one of claims 1 to 3 wherein digested gas generated by methane fermentation is used as an energy source of power generation to obtain electric power and steam and/or hot water accompanying the power generation is used as a heat source to heat the surplus sludge, and optionally a mixture of the surplus sludge with an initial settling sludge.

6. A method of anaerobic digestion of sewage sludge as defined in any one of claim 1 to 3 wherein the digested sludge to discard is dewatered and subjected to incineration disposal.

7. A method of anaerobic digestion sewage sludge as defined in claim 1 wherein the heat treatment temperature of the surplus sludge is from 100° C. to 200° C.

8. A method of anaerobic digestion of sewage sludge as defined in any one of claims 1 to 3 wherein the concentration of the dewatered sludge is 12 to 20% by weight.

* * * * *